Jan. 15, 1935.  C. E. ARMSTRONG  1,988,149
THERMOSTAT CONTROL
Filed June 21, 1933   2 Sheets-Sheet 1

Charles E. Armstrong
Inventor

Attorney

Jan. 15, 1935.    C. E. ARMSTRONG    1,988,149
THERMOSTAT CONTROL
Filed June 21, 1933    2 Sheets-Sheet 2
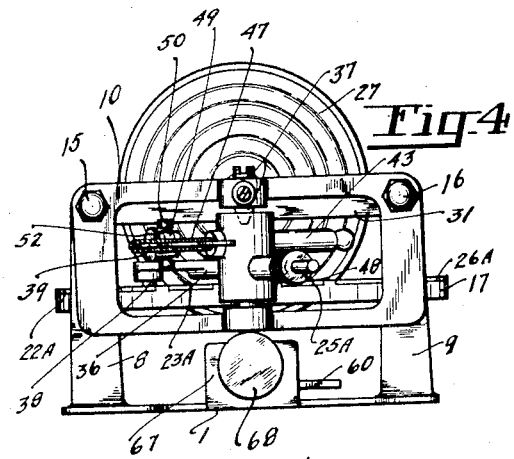
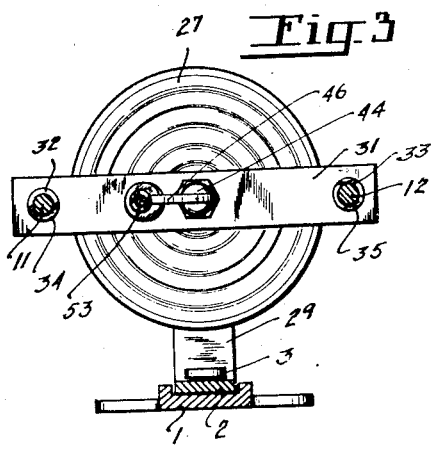
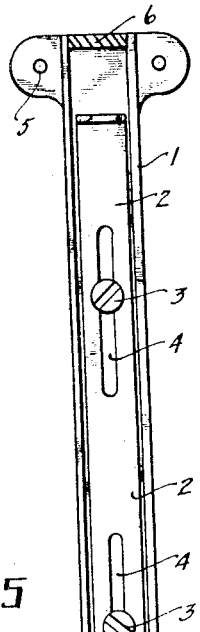
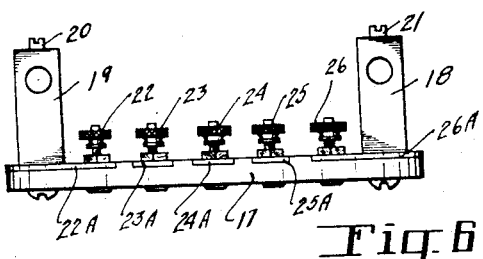
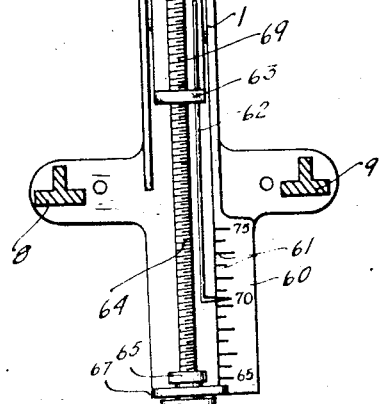
Charles E. Armstrong
Inventor
Attorney Patented Jan. 15, 1935

1,988,149

UNITED STATES PATENT OFFICE 1,988,149

THERMOSTAT CONTROL

Charles E. Armstrong, Corvallis, Oreg., assignor to Armstrong Heat Control Corporation, Corvallis, Oreg., a corporation of Oregon Application June 21, 1933, Serial No. 676,882

6 Claims. (Cl. 200—140)

This invention is used in conjunction with my co-pending application on Automatically controlled multiple valve for steam lines, Serial No. 676,884, filed June 21, 1933. It is used as the regulating means for the valves in the above mentioned device. The invention also relates to my co-pending applications on Automatic time controlling devices, Serial No. 676,881, and on Improvements in electro-mechanical timers, Serial No. 676,885, each filed June 21, 1933.

The primary object of my invention is to provide a device that will regulate the heat release from a source of supply to the distributing system so that the heat released will be proportional to the outside temperature. The device is particularly adapted to district heating systems where a number of buildings are heated from a central heating plant.

Another object of my invention is to provide a regulating thermostat that may be adjusted to operate in varying ranges of temperature.

Another object of my invention is to provide a regulating thermostat that will actuate, by completing electric circuits, a device that will control the quantity or the pressure of the heat that is to be admitted to the heat distributing system of a building.

A still further object of my invention consists in providing thermostat wafers filled with operating fluids having different boiling points to insure precise regulation over relatively wide temperature ranges.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 3 is a sectional end view of the assembled device. This view is taken on line 3—3 of Fig. 1, looking in the direction indicated.

Fig. 4 is an end view of the assembled device. This view is taken on line 4—4 of Fig. 1, looking in the direction indicated.

Fig. 5 is a sectional front view of the assembled device. This view is taken on line 5—5 of Fig. 2, looking in the direction indicated.

Fig. 6 is an end view of the insulated electric contact carrier shown removed from the assembly.

Fig. 7 is a fragmentary partially sectional side view of the contact arm.

Like reference characters refer to like parts throughout the several views.

Figures 1, 2:
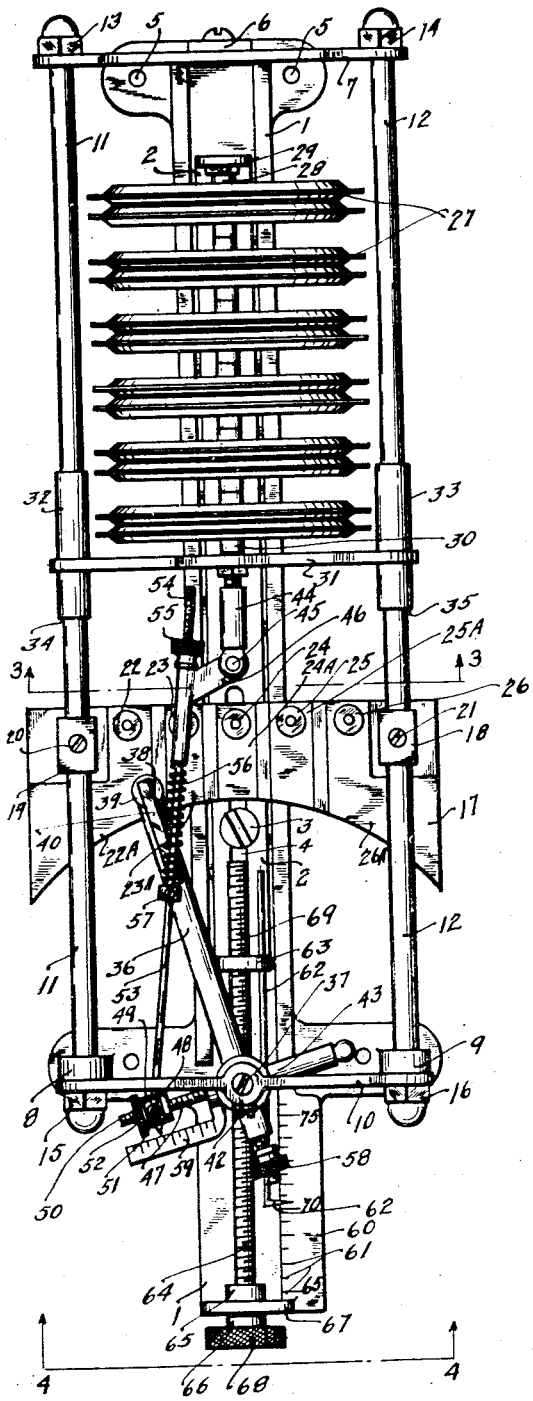
Fig. 1 is a front view of the assembled device.
Fig. 2 is a side view of the assembled device.

My invention in its preferred embodiment is comprised of a supporting base member 1 having a channel extending longitudinally and substantially the full length of the said base. An elongated bar 2 is slidably disposed within the channel and aids in supporting the thermostat wafers. Retaining screws 3 pass through elongated slots 4 in the bar 2 and are threaded into the base 1. The screws 3 are for the purpose of slidably retaining the bar 2 within the channel of the base 1.

Holes 5 are disposed through outwardly extending ears 5A at the top of the base 1, and are employed to secure the assembly to any suitable support. A bracket 6 also outwardly extends from the top of the base 1 and is disposed at right angles to the ears 5A, and a cross bar 7 is secured to the bracket 6 at right angles.

Another pair of ears 8A and 9A extend outwardly from the base 1 adjacent its lower end and lie in the same plane as the ears 5A. Supporting arms 8 and 9 are secured to and extend outwardly at right angles from the ears 8A and 9A respectively, and a journal bracket 10 is secured to the arms 8 and 9. The journal bracket is used to journal the contacting arm, which will be described later.

A pair of guide rods 11 and 12 are secured between the outer ends of the cross bar 7 disposed at the top of the base and the arms 8 and 9. The guide rods are parallelly disposed and are secured in fixed position by nuts 13, 14, 15 and 16. The purpose of the guide rods is to support the contact support and to guide the thermostat wafers during their expansion and contraction.

An electric contact support 17, made of an insulating material is secured to a pair of supporting legs 18 and 19. The legs 18 and 19 have holes disposed through them adjacent the end opposite the end attached to the contact support and the guide bars 11 and 12 extend through these holes. Set screws 20 and 21 in the legs 18 and 19 fixedly position the contact support upon the guide rods 11 and 12 relative to the contact arm 36.

Conductor segments 22A, 23A, 24A, 25A and 26A are disposed within the surface of the contact support 17 and terminals 22, 23, 24, 25 and 26 are secured to the respective conductor segments and complete the electric circuits between the contact arm 36 and the prime mover that actuates the heat controlling mechanism. The position of the contact arm in relation to the segments then determines the amount of heat permitted to enter the building from the source of supply.

A pair of sleeve members 32 and 33 are slidably disposed upon the guide rods 11 and 12 respectively and are secured together by a cross bar 31. A plurality of thermostat wafers 27 are supported between the cross bar 31 and an arm 29 that extends outwardly at right angles from the slide bar 2. The lower ends 34 and 35 of the sleeves are spaced sufficiently from the contact supporting legs 18 and 19 to permit maximum expansion of the thermostat wafers 27. The thermostat wafers are mounted so that the movement due to their combined expansion or contraction is transmitted to the cross bar 31 which is slidable relative to the guide bars 11 and 12 due to its connection to the sleeves 32 and 33. The bracket 29 is fixed and its position longitudinally of the base is determined by adjustment of the slide bar 2.

A contact arm 36 is rotatably mounted within the journal bracket 10 and is adapted to make contact with the contact segments 22A, 23A, 24A, 25A, and 26A. The contact arm assembly is comprised of a cylindrical member 36A that has cone shaped recesses centrally of each end, as illustrated by the dotted lines in Fig. 4. Cone shaped bearing members 37 are threaded through the bosses of the journal bracket 10 and the cone shaped portions are adapted to intimately contact the conical recesses in the cylindrical member 36A to provide a bearing for the same. The bearing members 37 are adjustable and are held in precise adjustment by a set screw 37A.

The contact arm 36 extends through the cylindrical member 36A with the major portion extending upwardly. The lower or shorter end is provided with an electric terminal 58 that conducts electricity from a source of supply not here shown. At the upper or long end there is disposed a hub 39, through which a hole is disposed. A contact brush 38 is placed in the hole and is adapted for movement therein. The contact is maintained in contact with the face of segments 22 to 26 inclusive by means of a spring member 40 that may be secured to the arm 36 as by a screw 41.

A threaded member 47 is secured to and extends from the cylindrical member 36A substantially at right angles to the contact arm 36. A knurled nut 48 has a collar 49 disposed within a groove about its periphery and is threadably disposed upon the bolt 47. Pins 51 outwardly extend from the collar and a yoke 50 is secured thereto. The yoke 50 terminates in the rod 53 which is indirectly connected to the thermostat wafer-supporting cross bar 31.

Opposite the bolt 47 there is disposed a counter-weight 43. The counter-weight is secured to the cylindrical member 36A in any suitable manner, and extends outwardly therefrom in the opposite direction from the bolt 47. The purpose of this counter-weight is to form a balance for the bolt 47 and its associated elements so that the thermostat wafers will not be required to contract against the force of the weight of the bolt 47 and its elements and will not be aided in expansion by their weight.

A threaded stem extends downwardly from the cross bar 31 and has threaded thereto a yoke end 44. An arm 46 is formed of a tubular section from which there obliquely extends a short arm section. The short arm section has a hole disposed in one end and is hingedly secured to the yoke end 44 by a pin 45.

The connecting rod 53 which has its yoked end secured to the adjusting nut 49 extends through the tubular portion of the arm 46. The end 54 of the rod 63 is threaded and a knurled adjusting nut 55 is disposed thereupon. A coil spring 56 placed about the rod 53 between the end of the arm 46 and a collar 57 maintains a relatively tight working connection between the thermostat wafers and the contact arm 36 and permits adjustment of the arm 36 upon the contact segments.

A graduated gauge 59 is secured to the cylindrical contact arm support 36A and is disposed in alignment with the bolt member 47. A pointer extends from the collar 49 and registers with the graduations on the gauge 59.

The adjustments that may be made between the thermostat wafers and the contact arm 36 by turning the knurled nuts 48 and 55 provide for changing the entire regulating temperature range or broadening or narrowing the range.

A graduated gauge 60 is secured to the side of the base 1 adjacent its lower end and is calibrated in degrees temperature. An ear 63 outwardly extends from the lower end of the slide bar 2 and an adjusting screw 64 is threaded therethrough. The adjusting screw 64 is secured rigidly with reference to the base by passing through an outwardly extending ear 67 at the lower end of the base and having a collar 65 fixedly secured about it on one side of the ear 67 and the hub 66 of the knurled knob 68 fixedly secured to the screw on the other side of the ear 67. Thus, when the screw 64 is rotated, the slide bar 2 will be forced up or down in the channel, depending on the direction the screw is rotated. Since the arm 29 at the upper end of the slide bar 2 supports the thermostat wafers on one end, this movement will be transferred to the wafers, thus expanding or compressing the wafers and changing the regulating temperature that will actuate the contact arm.

A pointer 62 is secured to the ear 63 and registers with the graduations on the gauge 60 to permit adjustment to the temperature that it is desired to maintain.

In installing and adjusting the device, it may be placed on the outside of a building and the electric terminals 22 to 26 inclusive are connected to the control device contained in my application on Automatically controlled multiple valve for steam lines. As an example we will consider that for an outside temperature of 40 degrees it is necessary that a certain amount of heat be admitted to the distributing system of building to maintain a temperature of 70 degrees inside the building. That amount we shall say will be the amount admitted when the contact arm 36 is in contact with the segment 24A.

The pointer 62 is then adjusted so that it registers with the 70 degree graduation on the gauge 60. Then the knurled adjusting nut 55 is turned on the threaded portion 54 of the rod 53, which turning causes the contact arm 36 to rotate, until the contact point 38 engages the surface of the contact segment 24A.

Any increase in outside temperature will of necessity demand less heat on the interior of the building. An increase in outside temperature will cause the thermostat wafers 27 to expand and thus cause the contact arm 36 to rotate in a counter-clockwise direction. When it has rotated sufficiently to make contact with the segment 23A, a circuit is completed through the segment and terminal 23 to the control device which decreases the amount of heat admitted to the building.

Any further increase in temperature outside causes a further rotation of the contact arm 36, and when it makes a contact with the segment 22A there is a still further decrease in the amount of heat admitted.

Inversely, any decrease in outside temperature causes the wafers to contract and communicates a clockwise rotation to the contact arm 36. As it rotates, the contact with the successive segments is made and each separate contact causes a greater amount of heat to be admitted.

In some installations it may be desirable to have a quicker or slower admission of heat for a given variation on the outside. This is accomplished by turning the knurled nut 48 upon the bolt 47. This changes the radius of the arc described by the yoke end 50 and the nut 48. As an example if the nut 48 is turned so it progresses toward the cylindrical support 36A, a greater arc will be described by the end of the arm 36 for the same movement of the thermostat wafers. Thus the heat will be admitted or restricted sooner than it would have if the knurled nut 48 were a greater distance from the center of the arm support. The inverse is true in the event that the knurled nut is turned so it is a greater distance from the center support.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a base frame, supporting brackets outwardly extending from the base frame, cross bars removably secured to the outer ends of the brackets, guide bars removably attached to the outer ends of the cross bars and parallelly mounted relative to each other, a slide carrier mounted within the base frame, manually settable means for positioning the slide carrier, a bracket outwardly extending from one end of the slide carrier, a plurality of thermostat wafers supported by the bracket of the slide carrier, an electric contact carrier slidably disposed upon the guide bars, and fixed relative thereto, electric terminals and contact plates mounted upon the electric contact carrier, an arm pivotally mounted upon one of the cross bars and carrying an electric contact adapted to coact with the contact plates mounted upon the electric contact carrier, and means communicating the movement of the spindle of the thermostat wafers to the arm.

2. In a device of the class described, the combination of a base frame, a slide carrier adjustably secured to the base frame, a plurality of thermostat wafers carried by the slide carrier, a pair of parallelly disposed guide rods supported relative to the frame, an electric contact carrier adjustably mounted upon the guide rods, a contact arm pivotally mounted relative to the base frame, means for adjusting the position of the contact arm and adjustable connections disposed between the thermostat wafer assembly and the swinging contact arm.

3. In a device of the class described, the combination of a base frame having parallelly disposed guide bars disposed therein, a carrier adjustably mounted within the base frame, a plurality of thermostat wafers fixedly mounted upon their one end to the carrier, means for maintaining the wafers in registry alignment with the guide bars of base frame, an electric contact carrier, a swinging arm rockably mounted upon the base frame, and adapted for making electric contacts with the electric contact carrier, and adjustable connecting means disposed between the swinging contact arm and the thermostat wafer assembly.

4. In a device of the class described, the combination of a base frame having guide ways parallelly and removably secured to a base frame, a slide carrier having a plurality of thermostat wafers removably secured thereto and adjustably mounted upon the slide carrier, an electric contact carrier having a plurality of electric terminals secured thereto and slidably mounted upon and positionable upon the guide ways, a swinging arm hingedly mounted relative to the base frame and the free end of the arm carrying a contact point that is adapted for making contact with the electric contact carrier, coacting means connecting the thermostat wafer assembly with the contact swinging arm and means for adjusting the connecting means.

5. In a device of the class described, the combination of a base frame, an adjustable thermostat-wafer-supporting slide bar slidably disposed within the base, means for adjusting the slide bar, brackets extending outwardly from the frame and having parallelly disposed guide rods secured longitudinally between them, a cross bar slidably secured to the guide rods, a plurality of thermostat wafers secured between the slide bar and the slidably disposed cross bar, a contact support adjustably fixed to the guide rods, contact segments disposed upon the contact support, a contact arm pivotally supported between the lower outwardly extending brackets from the base frame, a contact point on the contact arm, said contact point adapted to engage the contact segments, and adjustable means from communicating the expansion and contraction movement of the wafers to the contact arm.

6. In a device of the class described, the combination of a base frame, an adjustable thermostat-wafer-supporting slide bar slidably disposed within the base frame, a plurality of thermostat wafers secured on one end to a bracket extending from the slide bar, parallelly disposed guide rods secured between brackets extending from the base frame, a floating cross bar disposed between the guide rods and maintained in a horizontal position by them and having the other end of the plurality of wafers secured to it, a contact support and contact segments secured to the guide rods, a contact arm pivotally mounted relative to the frame, means for adjustably connecting the thermostat wafers with the contact arm, said means having an adjustment that permits changing the arc described by the contact arm for the same movement of the wafers.

CHARLES E. ARMSTRONG.